US011334540B2

(12) United States Patent
Yammine et al.

(10) Patent No.: US 11,334,540 B2
(45) Date of Patent: May 17, 2022

(54) NAMESPACE HIERARCHY PRESERVATION WITH MULTIPLE OBJECT STORAGE OBJECTS

(71) Applicant: NetApp, Inc., Sunnyvale, CA (US)

(72) Inventors: Ghassan Abdallah Yammine, Leander, TX (US); Kris Allen Meier, Cedar Park, TX (US); Jason Dillard Preston, Austin, TX (US); Derek William Beard, Austin, TX (US)

(73) Assignee: NETAPP, INC., San Jose, CA (US)

( * ) Notice: Subject to any disclaimer, the term of this patent is extended or adjusted under 35 U.S.C. 154(b) by 1058 days.

(21) Appl. No.: 15/143,339

(22) Filed: Apr. 29, 2016

(65) Prior Publication Data

US 2017/0091235 A1 Mar. 30, 2017

Related U.S. Application Data

(63) Continuation-in-part of application No. 14/866,793, filed on Sep. 25, 2015, now Pat. No. 10,929,419.

(51) Int. Cl.
G06F 16/22 (2019.01)
G06F 16/16 (2019.01)
G06F 16/18 (2019.01)
G06F 16/188 (2019.01)

(52) U.S. Cl.
CPC .......... G06F 16/22 (2019.01); G06F 16/164 (2019.01); G06F 16/1865 (2019.01); G06F 16/192 (2019.01)

(58) Field of Classification Search
CPC .... G06F 16/22; G06F 16/192; G06F 16/1865; G06F 16/164
See application file for complete search history.

(56) References Cited

U.S. PATENT DOCUMENTS

| 6,871,245 | B2 * | 3/2005 | Bradley ............. G06F 16/1794 710/65 |
| 9,043,277 | B2 | 5/2015 | Slik |
| 9,223,612 | B1 | 12/2015 | Feldman et al. |
| 9,317,576 | B2 | 4/2016 | Merriman et al. |
| 9,449,008 | B1 | 9/2016 | Oikarinen et al. |

(Continued)

OTHER PUBLICATIONS

Ali et al., "An OSD-based Approach to Managing Directory Operations in Parallel File Systems", Cluster Computer, IEEE International Conference, Sep. 29, 2008, pp. 175-184.

(Continued)

Primary Examiner — Pierre M Vital
Assistant Examiner — Andalib F Lodhi
(74) Attorney, Agent, or Firm — Haynes and Boone, LLP

(57) ABSTRACT

To leverage the attributes of object storage for applications/systems created to interface with a network files system, an object storage backed file system can accept the defined file system commands from the applications/systems and transform the file system commands into requests that target object storage. The file system is "backed" by object storage because attributes and content of file system entities are stored in objects. For instance, content data and metadata of a file are stored in objects in object storage. This object storage backed file system can be considered a bridge between a client perceived hierarchical file system namespace and a flat namespace of an object storage.

20 Claims, 10 Drawing Sheets

(56) References Cited

U.S. PATENT DOCUMENTS

| | | | |
|---|---|---|---|
| 9,785,403 B2 | 10/2017 | Goyal et al. | |
| 10,007,608 B2 | 6/2018 | Galchev et al. | |
| 10,140,304 B1* | 11/2018 | Bent | G06F 16/13 |
| 10,216,449 B1* | 2/2019 | Li | G06F 11/1451 |
| 2005/0234951 A1* | 10/2005 | MacCormick | G06F 16/13 |
| 2006/0129614 A1* | 6/2006 | Kim | G06F 11/1435 |
| 2010/0036870 A1* | 2/2010 | Lowry | G06F 16/289 |
| | | | 707/E17.009 |
| 2011/0078110 A1 | 3/2011 | Joseph | |
| 2013/0124466 A1* | 5/2013 | Naidu | G06F 16/235 |
| | | | 707/610 |
| 2013/0290648 A1* | 10/2013 | Shao | G06F 3/0689 |
| | | | 711/154 |
| 2013/0339406 A1* | 12/2013 | Kanfi | G06F 16/289 |
| | | | 707/825 |
| 2014/0081924 A1* | 3/2014 | Jennings | G06F 16/1824 |
| | | | 707/687 |
| 2014/0281131 A1 | 9/2014 | Joshi et al. | |

OTHER PUBLICATIONS

International Search Report and Written Opinion for Application No. PCT/US2016/053615 dated Jan. 3, 2017, 10 pages.

Welch et al., "Scalable Performance of the Panasas Parallel File System", Proceeding Of The 6th Usenix Conference on File And Storage Technologies (FAST 08), San Jose, CA, Feb. 26, 2008, 22 pages.

Bridgestor, "BridgeSTOR's Cloud Storage File System: Specifically Designed for Cloud and Object Storage," BridgeStor The World's Storage Made Available, White Paper, BridgeSTOR, LLC, Poway, CA USA, 2015, 7 pages.

Bridgestor, "Cloud Storage File System (CSFS)," BridgeStor The World's Storage Made Available, BridgeSTOR, LLC, Poway, CA, retrieved from http://www.bridgestor.com/English/Technology/Cioud_Storage_File_System.html on Aug. 20, 2015, 2 pages.

Fan, "NFSv4 Namespace & Migration," Rainfinity, retrieved from http://www.ietf.org/proceedings/61/slides/nfsv4-9/ietf-61.ppt on Aug. 31, 2015, 9 pages.

International Search Report and Written Opinion for Application No. PCT/US2017/030465 dated Jul. 10, 2017, 19 pages.

Ren K., et al., "TableFS: Enhancing Metadata Efficiency in the Local File System," USENIX Annual Technical Conference, 2012, Retrieved from the Internet: URL:http://www.pdl.cmu.edu/PDL-FTP/FS/CMU-PDL-12-110.pdf, pp. 1-22, XP0555379325.

\* cited by examiner

NAMESPACE HIERARCHY PRESERVATION WITH MULTIPLE OBJECT STORAGE OBJECTS

BACKGROUND

The disclosure generally relates to the field of data processing, and more particularly to file systems.

Many cloud storage solutions have adopted object storage as the storage paradigm. Instead of a hierarchical namespace of folders or directories, object storage typically has a flat namespace. The object storage is an abstraction that is independent of the underlying storage hardware and storage software. An account is associated with a logical container (e.g., a bucket), and the logical container contains variable sized objects in accordance with the configuration of the logical container. For instance, the container configuration can establish a maximum size of the container, unlimited object size, etc. Each object can hold data and metadata.

The objects in object storage are accessed with a web based service. The web based service may comport with the simple object access protocol (SOAP), the Representational State Transfer (REST) architecture, etc. For instance, objects in object storage can be accessed with requests defined by the Hypertext Transfer Protocol (HTTP) in accordance with the REST architecture. This allows scalability and access that is independent of location.

Although object storage offers scalability and flexibility, many deployed applications and/or systems have been created to interact with a file system. Thus, these applications/systems generate file system commands as defined by a particular protocol, such as the Portable Operating System Interface (POSIX) and server message block/common Internet filesystem (SMB/CIFS).

BRIEF DESCRIPTION OF THE DRAWINGS

Embodiments of the disclosure may be better understood by referencing the accompanying drawings.

DESCRIPTION

Terminology

Figure 1:
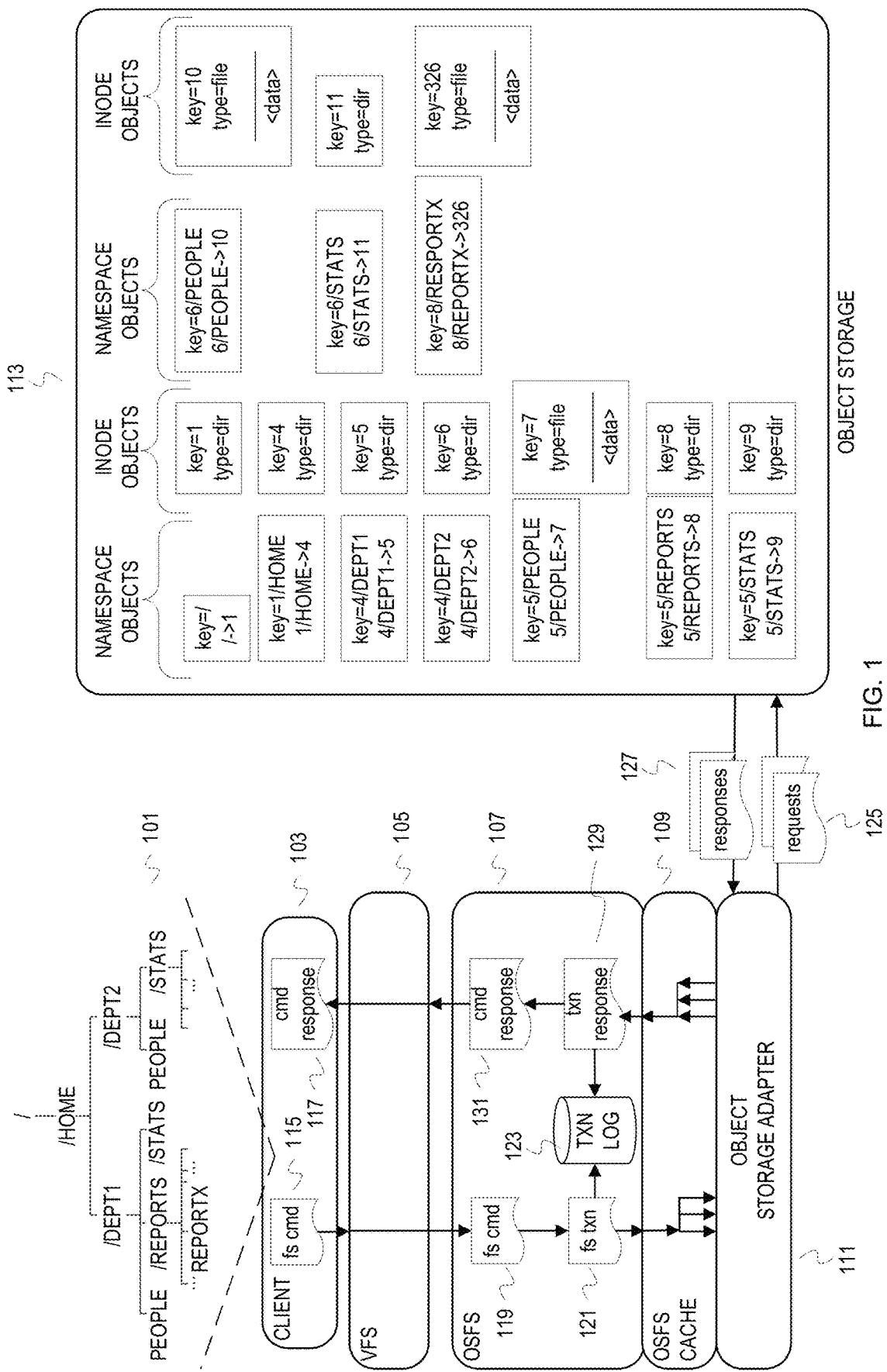
FIG. 1 is a conceptual diagram that depicts an example hierarchical file system namespace encoded into object storage with namespace objects by an object storage backed file system.

A file system includes the data structures and methods/functions used to organize file system objects, access file system objects, and maintain a namespace of the file system. File system objects include directories and files. Since this disclosure relates to object storage and objects in object storage, a file system object is referred to as a "file system entity" instead of a "file system object" to reduce overloading of the term "object." Thus, an "inode object" in this disclosure is not the data structure that represents a file in a Unix® type of operating system.

This description also uses "command," "request," and "operation" in a manner to reduce overloading of the terms. Although these terms can be used as variants of a requested action, this description aligns the terms with the source domain of the requested action. The description uses "command" to refer to a requested action from a client and as defined by a file system protocol. The description uses "operation" to refer to a requested action by the object storage backed file system. The description uses "request" to refer to an action sent to an object storage.

Overview

Although object storage is being offered as a highly scalable, geographically distributed storage solution, many applications and/or systems have been created to interact with established file systems, such as a distributed file system in accordance with the network file system (NFS) protocol used with a Unix type of operating system. To leverage the attributes of object storage for these applications/systems, an object storage backed file system can accept the established file system commands from the applications/systems (hereinafter clients) and transform the file system commands into requests that target object storage. The file system is "backed" by object storage because attributes and content of file system entities are stored in objects. For instance, content data and metadata of a file are stored in objects in object storage. This object storage backed file system can be considered a bridge between a client perceived hierarchical file system namespace and a flat namespace of an object storage.

To bridge the gap between the hierarchical and flat namespaces, the object storage backed file system ("OSFS") creates and maintains two objects in object storage for a file system entity. The objects include a namespace object and an inode object. The OSFS uses the namespace object to efficiently carry out file system commands and encode the file system namespace into object storage. With the dual objects, namespace commands (e.g., moving a file system entity or renaming a file system entity) can be carried out inexpensively. The OSFS uses the inode objects as the file system entities. For instance, an inode object will be created for a file system entity with metadata and file data, if relevant, of the file system entity. This object is referred to as an "inode" object because the object key is derived from the inode number of the file system entity.

The OSFS also includes a file system cache mechanism ("OSFS cache") to bridge the gap in performance of an object storage and local storage. The OSFS transforms file system commands into object storage operations, and submits the object storage operations to the OSFS cache. Since a file system command can hook into multiple object storage operations, the OSFS can present n object storage operations to the OSFS cache to perform as a transaction. Once submitted to the OSFS cache, the transaction is considered "in-flight" until a response is received from the OSFS cache. The OSFS maintains a log of the in-flight transactions ("transaction log"), which can be used in failover scenarios or writer re-assignment. After receiving a transaction, the OSFS cache generates object storage requests based on the object storage operations of the transaction. The semantics of the object storage operations align with the semantics of the object storage requests. The OSFS cache communicates the object storage requests to object storage. In addition, the OSFS cache determines whether the object storage operations can be satisfied from cached data. With the OSFS cache, the OSFS can respond to clients with locally stored data for many file system commands. And the encoding of the hierarchical namespace into namespace objects allows for a consistent view of the file system namespace across clients, regardless of how the clients access the object storage.

Example Illustrations

FIG. 1 is a conceptual diagram that depicts an example hierarchical file system namespace encoded into object storage with namespace objects by an object storage backed file system. In FIG. 1, a software stack runs on a host device in communication with a host device of a client 103 that generates file system commands and in communication with devices that provide access to storage devices that form an object storage 113. The software stack includes a virtual file system switch (VFS) 105, an object storage backed file system (OSFS) 107, an OSFS cache 109, and an object storage adapter 111.

The OSFS 107 creates and manages objects in the object storage 113 to present a hierarchical file system namespace 101 ("file system namespace") to the client 103. The hierarchical file system namespace 101 includes a number of directory levels, directories, and files. But FIG. 1 only depicts a few of the levels. The depicted portion of the file system namespace includes a root "/" and a single child directory of the root "HOME." The HOME directory includes child directories DEPT1 and DEPT2. The directory DEPT1 includes a file PEOPLE and directories REPORTS and STATS. The directory REPORTS includes a file REPORTX. The directory DEPT2 also includes a file PEOPLE and a directory STATS.

File system commands to create and manipulate the entities of this file system originate at the client 103. The file system commands can be defined by any one of a variety of network file system compatible protocols. Examples of the protocols include the Portable Operating System Interface (POSIX), server message block/common Internet file system (SMB/CIFS), and an SMB protocol variant (e.g., Samba). The client 103 in FIG. 1 generates a file system command 115. The VFS 105 receives the file system command 115 and forwards the file system command 115 to the OSFS 107. The VFS 105 may process the file system command 115 to some degree and pass the result of the processing to the OSFS 107. For instance, the VFS 107 may access its own directory cache and inode cache to resolve a name of a file system entity to an inode number corresponding to the file system entity indicated in the file system command. This information can be passed along with the file system command to the OSFS 107.

The OSFS 107 transforms the received file system command 115 into a file system transaction 121. The OSFS 107 determine a set of n object storage operations that implement the file system command 115 in object storage. The object storage operations are defined methods or functions that conform to object storage semantics, for example specifying a key value parameter. The OSFS 107 instantiates the object storage operations based on the parameters of the file system command 115 and any other information provided by the VFS 105. The OSFS 107 forms the file system transaction 121 with the object storage operation instances. The OSFS 107 may also perform additional actions in addition to instantiating the object storage operations. In the case of creating a file system entity, for instance, the OSFS 107 determines a new inode number for the file system entity and may convert the inode number from an integer value to an ASCII value, which could be used as a parameter value in an object storage operation used to form the transaction. The OSFS 107 submits the transaction 121 to the OSFS cache 109 and records the transaction 121 into a transaction log 123. If another node takes over for the node (e.g., virtual machine or physical machine) hosting the OSFS 107, then the transaction log 123 can be replayed.

The OSFS cache 109 attempts to fulfill file system transactions with locally stored data. If a transaction cannot be fulfilled with locally stored data, the OSFS cache 109 generates object storage requests 125 (or a preliminary form of an object storage request that is finalized by the object storage adapter) based on the object storage operation instances that form the file system transaction 121. The OSFS cache 109 communicates the object storage requests 125 via the object storage adapter 111, which conforms to a particular object storage implementation. For instance, the object storage adapter 111 may manage connections with an object storage.

The object storage 113 provides responses 127 to the requests 125. These responses travel up the software stack. The responses 127 are processed by the object storage adapter 111 and then passed to the OSFS cache 109. The OSFS cache 109 generates a transaction response 129 based on the responses 127, and communicates the transaction response 129 to the OSFS 107. The OSFS 107 updates the transaction log 123 to remove the transaction corresponding to the transaction response 129. The OSFS 107 generates a file system command response 131 based on the transaction response 129, and passes the response 131 back to the client 103 via the VFS 105.

As stated earlier, the object storage 113 includes the namespace objects and inode objects that correspond to the depicted hierarchical file system namespace 101. The namespace objects and inode objects result from the commands, operations, and requests that flowed through the software stack. As depicted, each file system entity in the hierarchical file system namespace 101 has a namespace object and an inode object. Below is a table that identifies the relationships among file system entities, namespace objects, and inode objects as depicted in FIG. 1.

TABLE 1

Relationship between file system entities and backing objects

| File System Entity | Object Elements | Namespace Object | Inode Object |
|---|---|---|---|
| / | key | / | 1 |
| | metadata | /-->1 | attributes of file system |
| /HOME | key | 1/HOME | 4 |
| | metadata | 1/HOME-->4 | type = dir; <permissions; userid; groupid; links; dates> |
| /HOME/DEPT1 | key | 4/DEPT1 | 5 |
| | metadata | 4/DEPT1-->5 | type = dir; <permissions; userid; groupid; links; dates> |
| /HOME/DEPT1/PEOPLE | key | 5/PEOPLE | 7 |
| | metadata | 5/PEOPLE-->7 | type = file; <permissions; userid; groupid; dates> |
| | content data | <empty> | <personnel data> |
| /HOME/DEPT1/REPORTS | key | 5/REPORTS | 8 |
| | metadata | 5/REPORTS-->8 | type = dir; <permissions; userid; groupid; links; dates> |
| /HOME/DEPT1/STATS | key | 5/STATS | 9 |
| | metadata | 5/STATS-->9 | type = dir; <permissions; userid; groupid; links; dates> |
| /HOME/DEPT2 | key | 4/DEPT2 | 6 |
| | metadata | 4/DEPT2-->6 | type = dir; <permissions; userid; groupid; links; dates> |
| /HOME/DEPT2/PEOPLE | key | 6/PEOPLE | 10 |
| | metadata | 6/PEOPLE-->10 | type = file; <permissions; userid; groupid; dates> |
| | content data | <empty> | <personnel data> |
| /HOME/DEPT2/STATS | key | 6/STATS | 11 |
| | metadata | 6/STATS-->11 | type = dir; <permissions; userid; groupid; links; dates> |
| HOME/DEPT2/REPORTS/REPORTX | key | 8/REPORTX | 326 |
| | metadata | 8/REPORTX-->326 | type = file; <permissions; userid; groupid; dates> |
| | content data | <empty> | <report data> |

As can be seen from Table 1, the inode objects include metadata that preserves attributes of the file system entities backed by the inode objects and indicates the type of file system entity. In table 1, the value "dir" is used to indicate that the inode object backs a directory file system entity and the value "file" backs a file. The attributes of the file system entity can be stored as a string assigned to a single metadata field, but custom fields can also be defined for each attribute or groups of attributes.

The namespace objects have keys that conform to a "<parent_inode#<entity_name>" format as previously explained. Each namespace object encodes an association or mapping of the "<parent_inode#<entity_name>" to the key of the corresponding inode object. In other words, the namespace object encodes a mapping of the "<parent_inode#>/<entity_name>" to the inode number of the file system entity. For instance, the file PEOPLE in the directory DEPT1 has a namespace object with a key "5/PEOPLE" because the encapsulating directory DEPT1 has an inode number 5. Likewise, the file PEOPLE in the directory DEPT2 has a namespace object with a key "6/PEOPLE" because the encapsulating directory DEPT2 has an inode number 6. Since each file system entity has a unique inode number generated by the OSFS, the combination of the encapsulating directory inode number and name of a file system entity efficiently conforms to namespace constraints of uniqueness within a directory. In other words, the files named "PEOPLE" conform to namespace constraints because they exist in different encapsulating directories and uniqueness of the two file system entities is compactly expressed with an inode number and name instead of, for instance, the entire pathname. This significance becomes more apparent when considering the hierarchical file system namespace 101 can have millions of file system entities across hundreds of levels. The efficiency of this compact representation also becomes apparent when considering file system commands that impact namespace, such as a move or rename.

Figure 2:
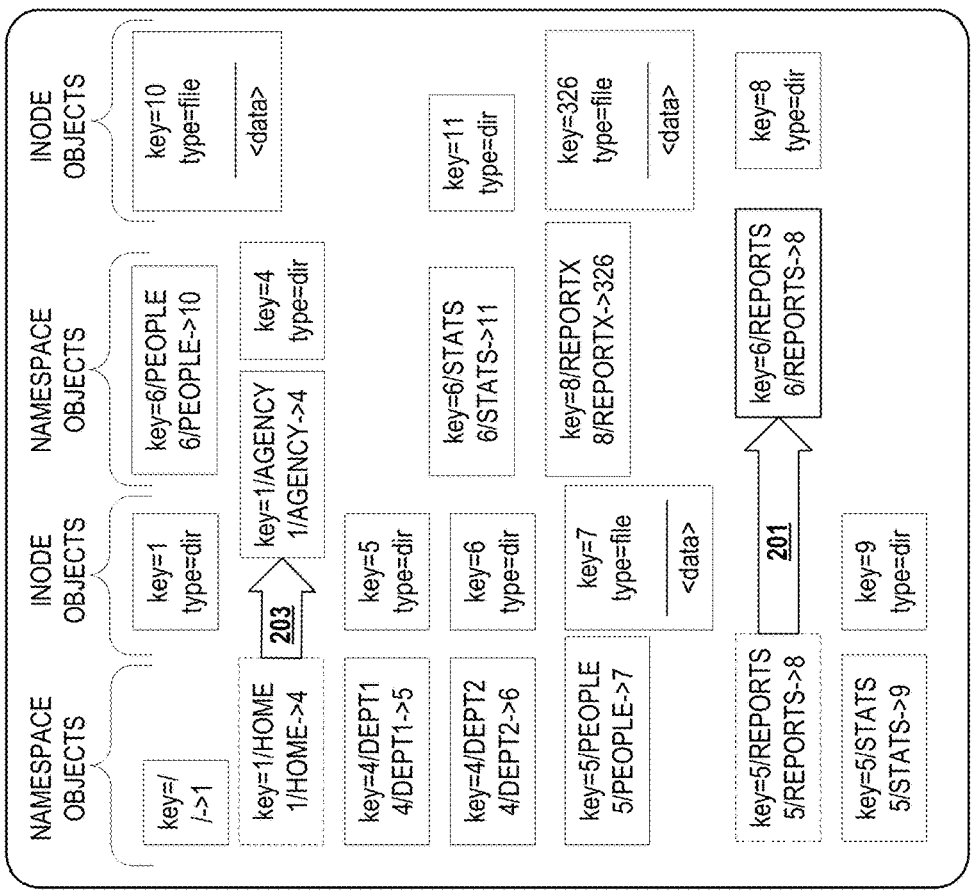
FIG. 2 is a conceptual diagram that depicts an example move of a directory in an object storage backed file system.
Figure 2:
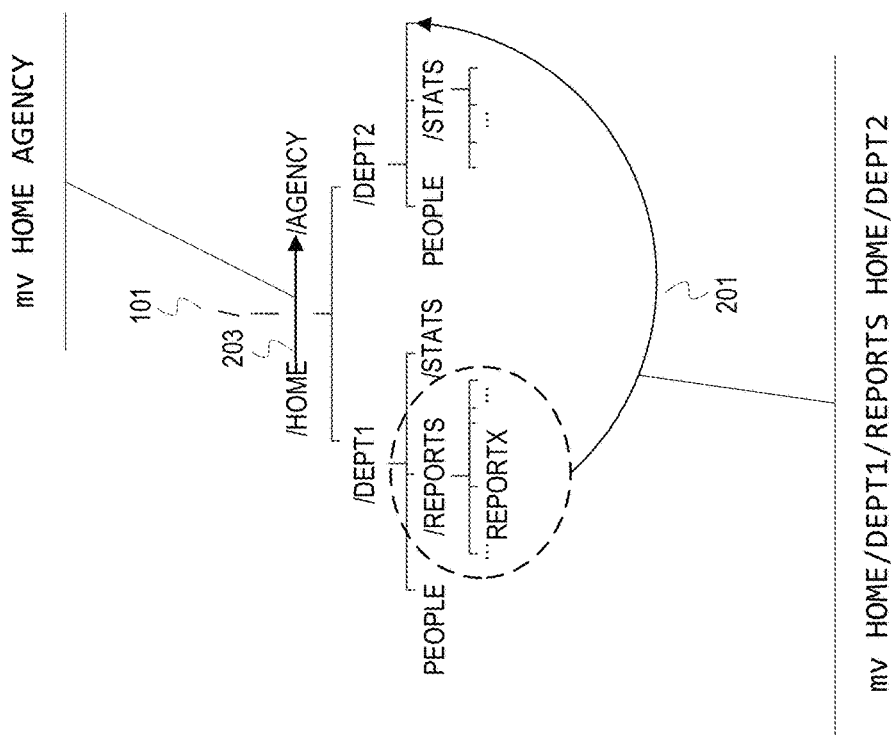

FIG. 2 is a conceptual diagram that depicts an example move of a directory in an object storage backed file system. FIG. 2 refers to the hierarchical file system namespace 101 and the object storage 113 from FIG. 1. For this illustration, the client 103 has submitted a file system command to move the directory /REPORTS from the encapsulating/parent directory DEPT1 to the directory DEPT2. Prior to instantiating object storage operations that effectuate the move, the OSFS 107 will instantiate object storage operations to validate the file system entities identified in the file system command—the two directories REPORTS and DEPT2. To validate, the OSFS 107 will instantiate file system operations with the inode numbers of REPORTS and DEPT2. The VFS 105 will have extracted the inode numbers from the client submitted file system commands and passed the inode numbers to the OSFS 107. The OSFS 107 can be designed to resolve a directory name to an inode number using its own directory structure in the case that the OSFS 107 receives a directory name instead of an inode number. When instantiating the validation object storage operations, the OSFS 107 may also convert the inode numbers from an integer to a character representation of the integer and use the character representation in the object storage operation instances, depending upon the key requirements of the targeted object storage. The validation operation instances can be inexpensive operations to confirm the existence of objects in object storage with the inode number based keys. So, the validation operations can eventually be transformed into object storage requests that fetch metadata of the objects identified by the object keys "8" and "6". With this metadata, the OSFS 107 determines that the file system entities are backed by objects and that the destination of the move (i.e., DEPT2) is a directory with the metadata of object "6."

The actual move (illustrated with arrows labeled 201) is implemented with object storage operation instances transformed into object storage requests that create a new namespace object for the REPORTS directory and delete the old namespace object. The OSFS 107 creates a new namespace object with a key "6/REPORTS" and metadata that indicates "6/REPORTS" maps to inode object "8," as depicted in FIG. 2. After confirmation that the new namespace object has been created, the OSFS 107 deletes the namespace object "5/REPORTS." As illustrated in FIG. 2, the move completes without creation of any new inode objects and without change operations rippling through the children of REPORTS. The OSFS 107 therefore avoids generating numerous operations instances and object storage requests to change all of the child entities. The OSFS avoids creating new objects for all child entities of the REPORTS as it would if object keys encoded entire paths for each object.

A rename presents another illustration of the efficiency of this dual object paradigm when manipulating entities in a hierarchical file system namespace backed by objects. The OSFS 107 can rename an entity with few actions. FIG. 2 depicts a rename of the directory HOME to AGENCY, as illustrated with arrows labeled 203. As with most file system commands, the OSFS 107 will first validate the file system entities relevant to the file system command. For the rename, validation will include confirmation that the backing inode objects exist and that the new name does not violate namespace constraints. The OSFS 107 or the VFS 105 can validate the new rename, for example, by confirming that the root does not encapsulate another entity with the same name and that the characters of the new name are valid ASCII characters. After validation, the OSFS 107 instantiates object storage operations that create a new namespace object "1/AGENCY" and delete the namespace object "1/HOME." The OSFS 107 creates the namespace object "1/AGENCY" with metadata that indicates the association of "1/AGENCY" with "4," which is the object key for the backing inode object. So, the OSFS 107 can implement a file system command that renames a file system entity in object storage by creating and deleting a single namespace object. Again, the OSFS 107 can avoid traversing all of the file system entities encapsulated by HOME to update the path to indicate AGENCY.

Figure 3:
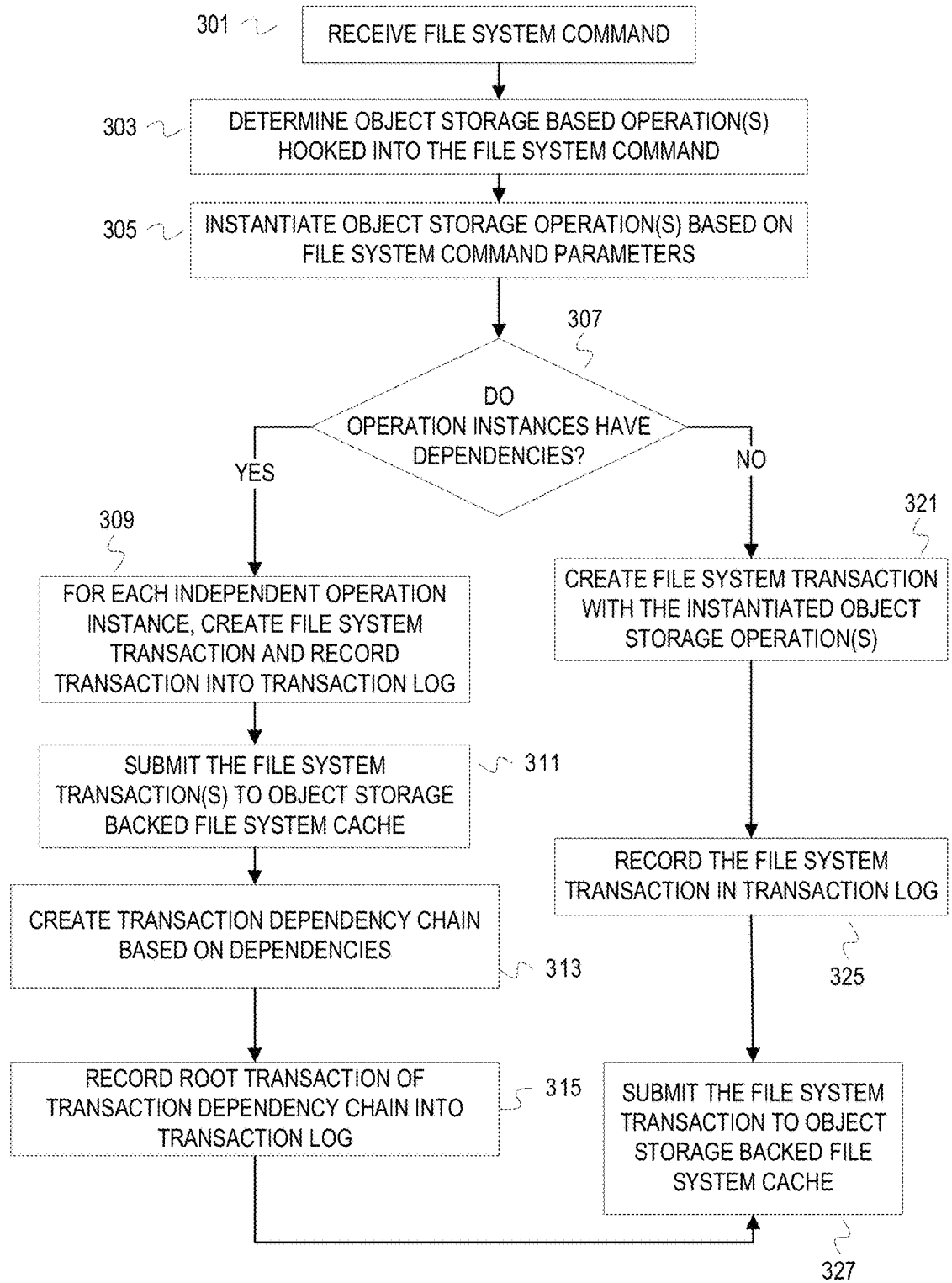
FIG. 3 is a flowchart of example operations for processing a file system command from a client of a file system.
Figure 4:
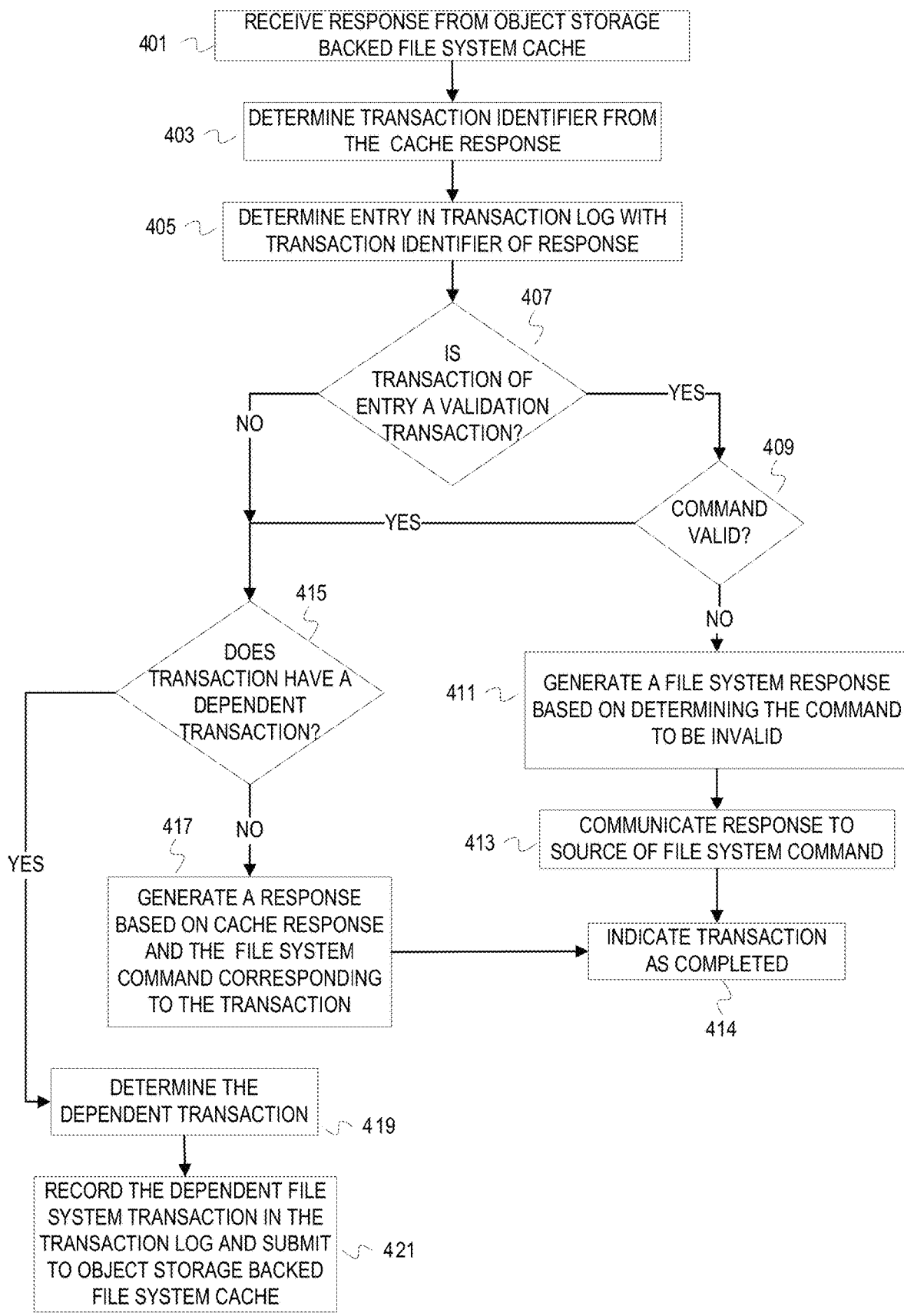
FIG. 4 is a flowchart of example operations for processing a response from object storage for a file system command.
Figure 5:
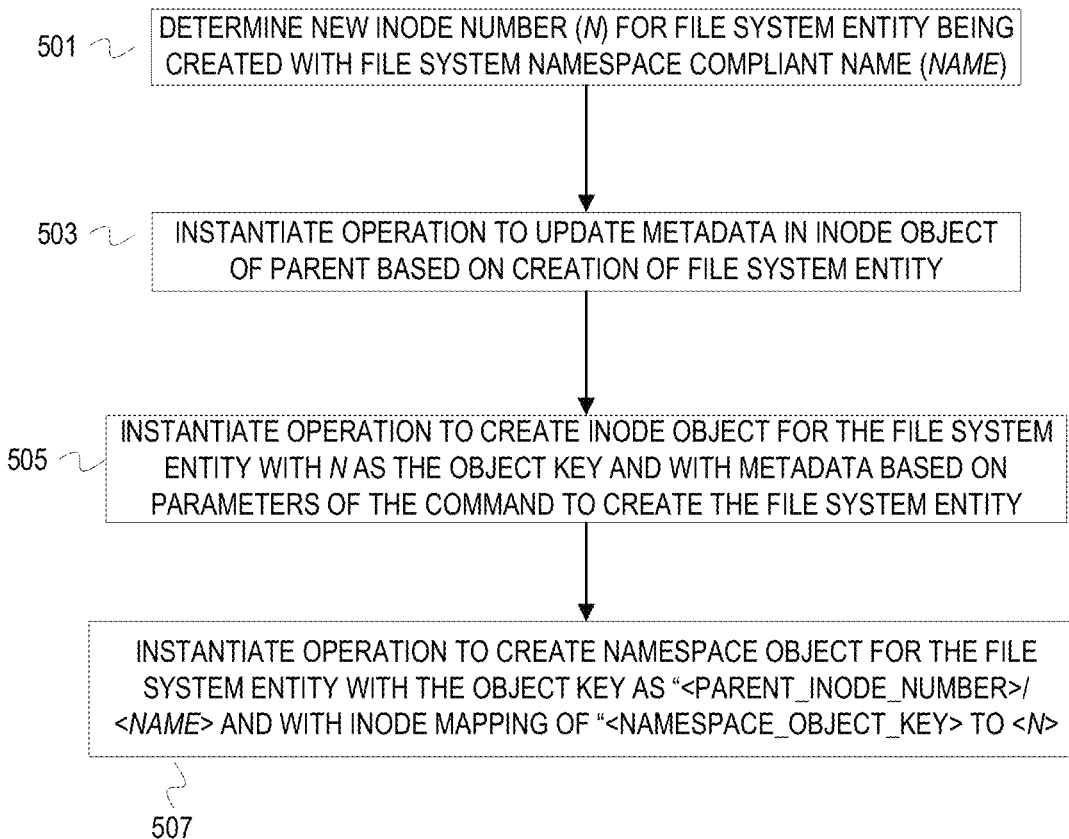
FIG. 5 depicts a flowchart of example operations for instantiating object based operations that form a transaction to create an inode object and a namespace object for a file system entity.
Figure 6:
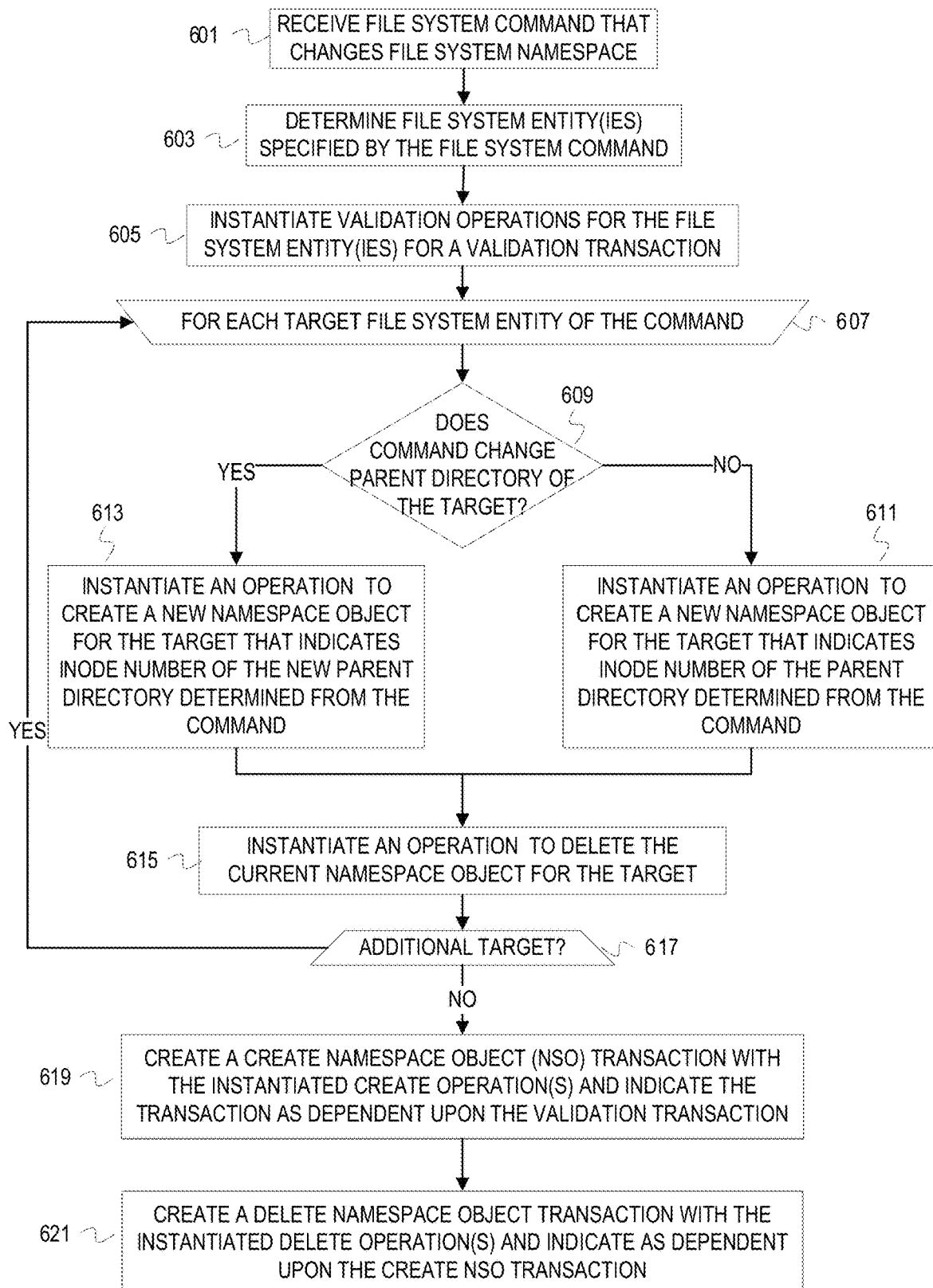
FIG. 6 depicts a flowchart of example operations for instantiating object based operations that form a transaction for file system commands that change a hierarchical file system namespace.

With the general organization of dual backing objects per file system entity established from the example conceptual illustrations, the following flowcharts in FIGS. 3-6 provide example operation flows for the OSFS. FIGS. 3-4 depict example operations for processing input file system commands and providing file system command responses. FIGS. 5-6 provide example operations to form transactions from object storage operation instances. The description of the FIGS. 3-6 refer to the OSFS performing the example operations for consistency with FIGS. 1 and 2. The description of FIGS. 3-6 also employs example names of object based storage operations (e.g., function, methods, procedures, etc.) to help explain the disclosure. The scope of the claims is not limited to a particular implementation because of the reference to the OSFS performing the operations and/or the chosen naming of object storage based operations. OSFS implementations can vary with platforms and developer choices (e.g., choice of programming language; separation of functionality into libraries, functions, etc.; implantation as a loadable kernel module; implementation as a user space file system; etc.).

FIG. 3 is a flowchart of example operations for processing a file system command from a client of a file system. An OSFS processes file system commands originating from a client. As stated earlier, the OSFS may receive a file system command with additional information (inode numbers) provided by an intermediary (e.g., virtual file system). The OSFS performs these example operations to implement the file system command (e.g., a Unix type of file system command) on objects in object storage that back the file system entities. Implementing a file system command involves transforming the file system command into object storage requests. Since a single file system command can explode into multiple object storage requests, the OSFS imposes atomic constraints on the object storage requests. A file system command does not complete successfully unless all of the corresponding object storage requests complete successfully. For these example operations, atomicity is enforced with transactions.

At block 301, the OSFS receives a file system command. The OSFS can receive the file system command via inter-process communication, a function invocation, etc. A file system command can generally be classified as one that creates a file system entity (e.g., mkdir), one that moves or renames a file system entity (e.g., mv), one that deletes a file system entity (e.g., rmdir), one that provides a view of a file system (e.g., ls), or one that specifically modifies metadata of a file system entity (e.g., chmod). A file system command categorized as specifically modifying metadata of a file system entity is distinguished from the file system commands that change metadata, but have a different primary purpose.

At block 303, the OSFS determines an object storage based operation(s) hooked into the file system command. The OSFS can use handlers (i.e., software components that "handle" function calls). The handler structure can vary, but generally includes operations that correspond to object storage requests and supporting operations. For instance, an object storage based operation ReadObjectMetadata can correspond to a HEAD request. The ReadObjectMetadata operation is defined with parameters that correspond to the expected parameters of the HEAD request. Supporting operations include operations that facilitate instantiating object based operations (e.g., populating the parameter values for the object based operation). Examples of these supporting operations include operations to generate a new inode number, construct an object key, and generate a character representation of an inode number. Some supporting operations are themselves object based operations. For instance, a handler can include validation operations that ensure the existence of backing objects in object storage. The validation operations can involve checking metadata of objects.

Each file system command can resolve to a handler for that file system command. For example, the file system command may be 'mkdir.' Typically, this would invoke a call to a function 'mkdir' as defined by an interface (e.g., POSIX). Instead, the OSFS will resolve the command to a mkdir handler that generates one or more object storage based operations to implement the file system command. An example mkdir handler can include operations to validate the existence of the object backing a destination directory identified in the pathname specified for the mkdir command and to validate the requested directory name. To validate the destination directory, the mkdir handler includes a ReadObjectMetadata operation that uses the inode number of the destination directory as a parameter value that will be used as a key for the HEAD request. A VFS may pass the inode number of the destination directory to the OSFS, or the OSFS can maintain a directory table to resolve names to inode numbers. To validate the requested name, the mkdir handler can include operations to extract the requested name from the received file system command parameters and construct a key with the destination directory inode number and requested name. The OSFS can use the ReadObjectMetadata operation with the constructed key. A "successful" result would indicate that the name is already in use in the destination directory and is therefore unavailable. The mkdir handler also includes operations to create the inode object and the namespace object for the directory being created. The mkdir handler can include a CreateObject operation, which corresponds to a PUT object storage request, for each object to be created.

At block 305, the OSFS instantiates the object storage based operations based on the file system command parameters. The file system command parameters may specify file system attributes in addition to a pathname and entity name. Continuing with the mkdir command as an illustrative example, the mkdir handler would instantiate the ReadObjectMetadata operation with the inode number of the destination directory as a key parameter value and instantiate the ReadObjectMetadata with the constructed "<destination_dir_inode#<requested_name>" key parameter value. To create the inode object of the directory being created, the mkdir handler would instantiate the CreateObject operation with the new inode number generated for the directory being created as the key parameter value and with any attributes from the file system command parameters as a metadata parameter value (e.g., ownership mode). As previously stated, the semantics for object metadata fields can vary. Thus, the parameter semantics for the object storage based operations would correspond to the object metadata field semantics. To create the namespace object, the mkdir handler would instantiate the CreateObject operation with the key parameter value "<destination_dir_inode#>/<requested_name>" and a metadata field parameter that associates "<destination_dir_inode#<requested_name>" with the inode object key.

At block 307, the OSFS determines whether the object storage based operation instances include dependencies among them. For instance, object creation operations may be dependent upon validation operations. If the object storage based operation instances have dependencies, then control flows to block 309. Otherwise, control flows to block 321.

At block 321, the OSFS creates a file system transaction with the instantiated object storage operation(s). To conform to the property of atomicity, the OSFS identifies multiple object storage based operation instances for a file system command as a single transaction. If the transaction does not complete successfully, then the file system command does not complete successfully. Creating the file system transaction can include generating a transaction identifier and associating the generated transaction identifier to the object based instances that form the transaction.

At block 325, the OSFS records the file system transaction into a transaction log. The OSFS can record the transaction identifier into the transaction log, and use the transaction identifier as a reference to determine the operation instances that form the transaction. The OSFS may also record the constituent operation instances into the transaction log in association with the transaction identifier.

At block 327, the OSFS submits the file system transaction to the OSFS cache. To submit the file system transaction to the OSFS cache, the OSFS can communicate the file system transaction identifier to the OSFS cache. The OSFS cache can use the transaction identifier as a reference to obtain the constituent operation instances. The OSFS could instead communicate both the transaction identifier and the constituent operation instances to the OSFS cache with a memory address or with an encapsulating message, for example.

If the OSFS determined that the operation instances for a given file system transaction had dependencies (307), then the OSFS creates a file system transaction for each independent operation instance at block 309. Although dependencies exist among the operation instances for a file system command, the OSFS may determine that some operation instances are independent. The OSFS can create a transaction for each independent operation instance. Although independent among the operations instances, an independent operation instance likely still influences a response to a file system command. The OSFS also records each transaction into the transaction log.

At block 311, the OSFS submits the file system transaction(s) for the independent operation instance(s) to the OSFS cache.

At block 313, the OSFS creates a transaction dependency chain based on the dependencies among the remaining operation instances. The OSFS determines a root operation instance and the subsequence dependency(ies) to create the chain. For example, an operation instance that validates the existence of a file system entity in object storage can be a root transaction for a dependency chain. An operation instance that validates a name can be a transaction dependent upon the root transaction, and a set of operation instances that create an inode object and a namespace object can form a transaction that is dependent upon the name validation transaction. Creation of the chain can include creating a queue of the transactions, a structure that identifies the transaction identifiers and dependencies, etc.

At block 315, the OSFS records the root transaction of the transaction dependency chain into the transaction log. The OSFS can record the chain into the transaction log as well as the root, and indications of which transactions have completed within the chain. The OSFS can record dependent transactions from the dependency chain into the transaction log when its parent transaction completes. For instance, the OSFS can pop transaction from a first-in-first-out queue when parent transactions complete. After recording the transaction, the OSFS submits the root transaction to the OSFS cache.

FIG. 4 is a flowchart of example operation for processing a response from object storage for a file system command. The OSFS cache will provide responses to the OSFS based on responses from object storage. In these examples, the object storage responses (e.g., hypertext transfer protocol responses) pass through the aforementioned object storage adapter. The responses from the OSFS cache are tied to transactions previously communicated to the OSFS cache from the OSFS.

At block 401, the OSFS receives a response from object storage backed file system cache. The OSFS cache can communicate the response in accordance with the communication technique used by the OSFS to communicate the corresponding transaction (e.g., inter-process communication, method invocation, messaging, event driven memory referencing, etc.).

At block 403, the OSFS determines a transaction identifier from the OSFS cache response. The response will indicate a transaction identifier.

At block 405, the OSFS determines an entry in the transaction log with the transaction identifier determined from the response. The OSFS determines the entry in accordance with the transaction log implementation. For example, the transaction identifier may be an index into a hash table or a key value for accessing a database.

At block 407, the OSFS determines whether the transaction of the entry is a validation transaction. The OSFS use markers or tags to indicate a transaction as a validation transaction. If the transaction is a validation transaction, then control flows to block 409. Otherwise, control flows to block 415.

At block 409, the OSFS determines whether the file system command that was received is valid. For instance, a failed object storage response for a validation transaction that determined whether a backing object exists in object storage means the file system command is invalid (e.g., a specified parent directory does not exist). A successful object storage response to a name validation transaction means that the name is already in use. Thus, the file system command indicated an invalid name for an entity to be created. If the file system command is invalid based on the response, then control flows to block 411. If the file system command is valid based on the response, then control flows to block 415.

At block 411, the OSFS generates a file system response based on the determination that the file system command is invalid. The OSFS creates a file system command response that indicates an error. The file system response can elaborate on the error (e.g., invalid pathname).

At block 413, the OSFS communicates the file system response back to the client. The OSFS may communicate the file system response to the client via one or more intermediaries (e.g., VFS, Filesystem in Userspace (FUSE), etc.).

At block 414, the OSFS indicates the transaction as complete. The OSFS can mark the transaction as complete in the transaction log and remove the transaction later. Alternatively, the OSFS may indicate the transaction as complete by removing it from the transaction log.

If the file system command is valid or the transaction is not a validation transaction, then the OSFS determines whether the transaction has a dependent transaction at block 415. The transaction log can indicate transaction dependencies. The OSFS can also maintain a separate structure of dependency chains indexed by currently in-flight parent transactions. If the transaction has a dependent transaction, then control flows to block 419. Otherwise, control flows to block 417.

At block 417, the OSFS generates a file system response for the command corresponding to the transaction. The file system response is based on the response from OSFS cache and the file system command. For instance, the response may be an indication of success or may provide other information (e.g., a listing of directories or file system attributes specified for file system entities). Control flows from block 417 to block 414.

If there was a dependent transaction, then the OSFS determines the dependent transaction at block 419. The dependent transaction may be recorded into the transaction log. For instance, a log entry can indicate a transaction and one or more dependent transactions. The OSFS can read the entry to determine the dependent transaction and update the entry to indicate the dependent entry. If dependent transactions are not indicated in the log entry, the OSFS can determine the dependent transaction with a separate structure used to track transaction dependency chains.

At block 421, the OSFS records the dependent transaction into the transaction log as an in-flight transaction. The OSFS submits the dependent transaction to the OSFS cache coincident with recording the dependent transaction into the transaction log as an in-flight transaction.

The above examples illustrated with FIGS. 3-4 refer to the mkdir command to aid in explanation. To further aid in understanding the disclosure, the readdir command will be used as an additional illustrative example. In response to a readdir command, the OSFS readdir handler converts the inode number of the specified directory to a format that can be used as an object key, a character representation for instance. The readdir handler instantiates a ReadObjectMetadata operation with the object key and communicates the instantiated operation to OSFS cache. A successful object storage response confirms the existence of a backing inode object for the specified directory. The object storage response will include metadata of the backing inode object. This metadata includes file system attributes of the specified directory and an entity type. If the entity type does not indicate directory, then the OSFS returns an error response to the client (i.e., the client submitted a readdir on a file). After validation, the readdir handler instantiates a ListObjects operation. For the ListObjects operation instance, the readdir handler constructs a request parameter from the object key of the directory inode object. Referring to the namespace depicted in FIG. 1, the readdir handler would construct a request parameter with a value of "5/" for a file system command "readdir /HOME/DEPT1." This request parameter would be used as a prefix for searching object keys of the targeted object storage container (e.g., in a GET request). The object storage response would include metadata of each namespace objects that has "5/" in the object key. Since the metadata of a namespace object includes a mapping to the corresponding inode number, the readdir handler has a list of the names and inode numbers for file system entities directly encapsulated (child, not grandchildren) within the specified directory. The OSFS can create a readdir response with this information.

FIG. 5 depicts a flowchart of example operations for instantiating object based operations that form a transaction to create an inode object and a namespace object for a file system entity. FIG. 5 is a generalized flow to show example operations that would be common across file system commands that create file system entities. Validation operations and some supporting operations are not described.

At block 501, the OSFS determines a new inode number (N) for a file system entity being created with a file system compliant name (NAME). The OSFS extracts NAME from a received file system command. The OSFS or a preceding component (e.g., VFS) can determine whether NAME is compliant (e.g., conforms to length and character restrictions). The OSFS associates a currently available inode number to NAME and increments the available inode number.

At block 503, the OSFS instantiates an object based operation to update metadata in an inode object of a parent directory of the file system entity to be created. For example, the OSFS instantiates an operation UpdateParentMetadata with a key parameter value for the parent inode object and a parameter value(s) for the metadata fields being updated (e.g., links). This can be transformed by the OSFS cache into a PUT request. This would overwrite the current inode object metadata.

At block 505, the OSFS instantiates an object based operation to create an inode object to back the specified file system entity. For example, the OSFS instantiates an operation CreateObject with a key parameter value derived from N (the character representation of the integer N) and metadata for the file system attributes specified in the file system command. The CreateObject instance is transformed by the OSFS cache into a PUT request.

At block 507, the OSFS instantiates an object based operation to create a namespace object to back the specified file system entity. For example, the OSFS instantiates an operation CreateObject with a key parameter value "<parent_inode#>/NAME" and metadata that associates the namespace object to the inode object. The metadata could be expressed as "<parent_inode#/NAME→N". The CreateObject instance is transformed by the OSFS cache into a PUT request with the associated parameter values.

FIG. 6 depicts a flowchart of example operations for instantiating object based operations that form a transaction for file system commands that change a hierarchical file system namespace. FIG. 6 is a generalized flow to show example operations that would be common across file system commands that change a hierarchical file system namespace and focus on the namespace object. FIG. 6 also presents example operations for a command that affects multiple file system entities.

At block 601, the OSFS receives a file system command that changes a hierarchical file system namespace. For example, the OSFS receives a mv or chroot command.

At block 603, the OSFS determines a file system entity(ies) specified by the file system command. Depending upon the command, the OSFS may extract an entity name and/or determine an inode number for the file system entity. Specified entities can include a target entity (e.g., a directory or file to be moved) and a parent directory.

At block 605, the OSFS instantiates validation operations for the file system entity(ies) for a validation transaction. The OSFS instantiates a ReadObjectMetadata operation for each determined file system entity and a key parameter value from the corresponding inode number. All of the validation operation instances can be grouped as a single transaction since failure of one leads to an error for the command.

At block 607, the OSFS begins operations for each target file system entity of the command. In this example, the operations are represented by blocks 609, 611, 613, and 615.

At block 609, the OSFS determines whether the command changes a parent directory of the target. As examples, a command can move a file system entity into a different parent directory or create a new parent directory. If the command changes the parent directory of the target, then control flows to block 613. Otherwise, control flows to block 611.

At block 613, the OSFS instantiates an object based operation to create a namespace object to back the target file system entity. For example, the OSFS instantiates an operation CreateObject with a key parameter value "<new_parent_inode#>/<entity_name>" and metadata that associates the namespace object to an inode object that backs the target file system entity. The metadata could be expressed as "<new_parent_inode#<entity_name>→<target_inode#>". The CreateObject instance is transformed by the OSFS cache into a PUT request with the associated parameter values.

At block 611, the OSFS instantiates an object based operation to create a namespace object to back the target file system entity when the parent directory is not changing. For example, the OSFS instantiates an operation CreateObject with a key parameter value "<current_parent_inode#>/<entity_name>" and metadata that associates the namespace object to an inode object that backs the target file system entity. The metadata could be expressed as "<current_parent_inode#>/<entity_name>→<target_inode#>". The CreateObject instance is transformed by the OSFS cache into a PUT request with the associated parameter values.

Both blocks 611 and 613 continue to block 615.

At block 615, the OSFS instantiates an object based operation to delete a current namespace object that backs the target file system entity. For example, the OSFS instantiates an operation DeleteObject with a key parameter value "<current_parent_inode#/><entity_name>." The inode number is known since the current parent directory is one of the specified file system entities. The DeleteObject instance is transformed by the OSFS cache into a DELETE request with the associated parameter values. If the object storage supports versioning, then the OSFS can utilize version numbers.

At block 617, the OSFS determines whether there is an additional target file system entity of the file system command. If not, then control flows to block 619. Otherwise, control flows back to block 607 for selection of the next target file system entity.

At block 619, the OSFS creates a transaction for creating a namespace object(s) from the CreateObject instance(s). The OSFS indicates the create namespace object transaction as dependent upon the validation transaction.

At block 621, the OSFS creates a transaction for deleting a namespace object(s) from the DeleteObject instance(s). The OSFS indicates the delete namespace object transaction as dependent upon the create namespace object transaction. In this example, the delete transaction is dependent upon the create transaction in case the create transaction fails.

Although FIGS. 5-6 generally encompass creating objects for a file system entity and forming transactions to modify a hierarchical file system namespace, a few other types of file system commands that impact namespace deviate to a degree from the example general flow of operations. Examples of such command types include commands that create a file system (e.g. mkfs) and commands that delete a file system (e.g., rmfs, destroy, etc.). Creating a file system mostly involves preparing the storage device(s) that backs the file system and creating bookkeeping data (i.e., metadata for the file system). Since the OSFS is backed by an abstraction of the actual storage device(s), the device preparation aspects for creating a file system (e.g., creating partitions, formatting, etc.) are not a factor. When creating an object storage backed file system, the logical container in object storage may be created as part of a create file system type of command if the logical container was not previously created. An operating system may expose object storage accounts and/or logical containers in object storage as devices and/or partitions. A file system command to create a file system may use an exposed object storage account or logical container identifier as a device identifier. After creation of the logical container that defines the space for the file system, an inode object is created for a root of the OSFS being created. This root inode object can be considered a superblock for the OSFS being created. The root inode object has a root key (e.g., '1') and is created with file system characteristics metadata. Examples of the file system characteristic metadata includes a size of the file system, the type of file system (e.g., ext2, ext3, etc.), and block sizes. Although most of this information may not be used for accessing file system data, the information can be used to provide responses to file system commands expected to be supported that return file system characteristic data. In addition to the inode object, a namespace object is created for the root as part of creating the OSFS. An example of a root namespace object is depicted in FIG. 1.

For a delete file system type of command, the OSFS will delete the logical container that corresponds to the file system. However, object storage services generally do not allow deletion of logical containers that are not empty. Therefore, the OSFS will likely instantiate operations to determine the objects of the logical container that corresponds to the file system, delete the objects, and then delete the logical container. To determine the constituent objects, the OSFS creates a transaction with one or more operation instances for obtaining the metadata of the namespace objects in the logical container to be deleted. For example, the OSFS creates a transaction with one or more operation instances that eventually result in a GET request to the backing object storage. The GET request can request all objects with an object key that begins with the root namespace object key. The OSFS advances through each level of the file system namespace and builds a list of the objects keys of all of the namespace objects and inode objects with the metadata returned from the namespace objects. With the list, the OSFS creates a transaction with operation instances to delete the namespace objects and the inode objects, with the exception of the namespace object and the inode object for the root ("root objects"). The root objects are deleted last since the root inode object contains file system characteristic metadata.

In addition to the different type of file system commands, an example of updating a file has not been provided. When the OSFS receives a command to write to a file, the OSFS validates the existence of the inode object that backs the target file. With the returned object metadata from the validation operation, the OSFS also determines whether the object type is a file in order to proceed. If validation is successful, the OSFS generates metadata for the target file. In addition to metadata based on specified file system attributes in the file system command, the OSFS generates metadata corresponding to the file write itself (e.g., ctime, mtime, and file size if impacted). The OSFS instantiates a WriteObjectData operation with the metadata as metadata parameter values and the inode object key as determined from the file system command (i.e., the inode number of the inode object backing the target file). The OSFS cache transforms this operation instance into a multipart upload that is managed by the object storage adapter. More specifically, this operation instance is transformed into a PUT with a part number based on byte range of the extent being written and one or more PUT requests that copy the unchanged parts of the target file. When OSFS receives a response indicating completion of the multipart upload, then the OSFS supplies a successful response to the client.

Figure 7:
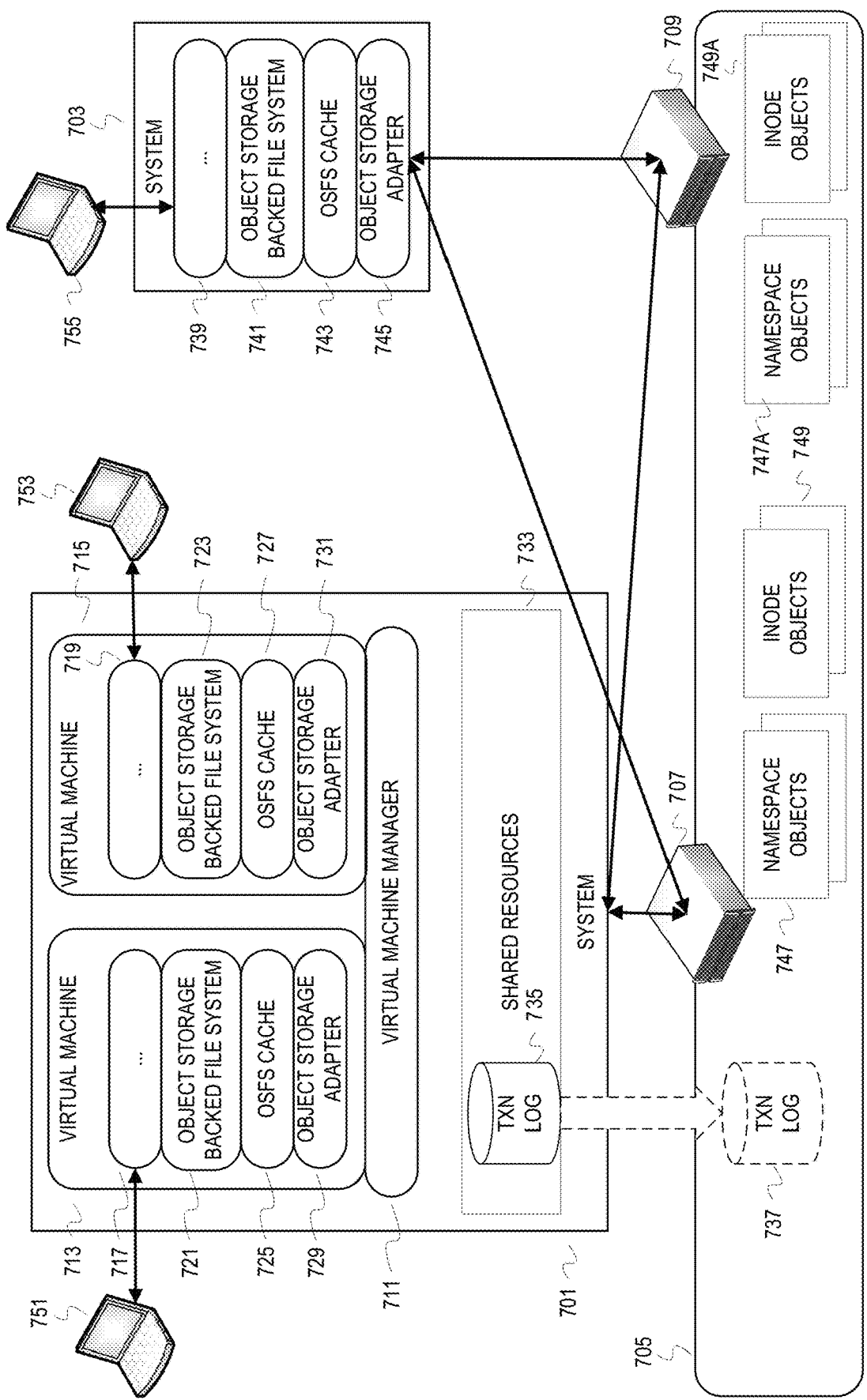
FIG. 7 depicts an example deployment of an object storage backed file system across virtual machines and physical machines.

The preceding examples refer to software components without being anchored in a particular deployment. A variety of deployments are possible, but FIG. 7 is provided for one example context of the OSFS. FIG. 7 depicts an example deployment of an object storage backed file system across virtual machines and physical machines. FIG. 7 presumes a single write deployment of the OSFS. In other words, file system commands that write to the file system are directed to a specified instance of the OSFS, while read types of requests can be directed to any OSFS instance.

The depicted deployment includes a server device 701 and a server device 703. The depicted deployment also includes object storage front end devices 707, 709 for an object storage 705. The server devices 701, 703 are in communication with the object storage front end devices 707, 709. Assuming that the server devices 701, 703 are configured as part of a cluster, client devices can communicate with either of the server devices 701, 703. This example illustration only depicts three client devices 751, 753, 755.

The server device 701 hosts two virtual machines 713, 715. Each of the virtual machines 713, 715 include a software stack. The software stack of the virtual machine 713 includes an unspecified component 717, an object storage backed file system 721, an OSFS cache 725, and an object storage adapter 729. The software stack of the virtual machine 715 includes an unspecified component 719, an object storage backed file system 723, an OSFS cache 727, and an object storage adapter 731. The unspecified components 717, 719 represent one or more software components that may process file system commands before arriving at the object storage backed file system 721, 723. The unspecified components 717, 719 need not be the same. Either of the unspecified components 717, 719 can be comprised of a virtual file system switch, a loadable kernel module that redirects (e.g., the Filesystem in Userspace module), and associated libraries. Similar to the virtual machines, the server device 703 includes a software stack. The software stack on the server device 703 includes an unspecified component 739, an object storage backed file system 741, an OSFS cache 743, and an object storage adapter 745.

The virtual machines 713, 715 are managed by a virtual machine manager 711, which may also be referred to as a virtual machine monitor or hypervisor. The virtual machine manager 711 provides the virtual machines 713, 715 access to shared resources 733 of the server device 701. Assuming either the OSFS 725 or the OSFS 727 is designated as the file system writer, a transaction log is maintained in the shared resources 733. With the transaction log 733 in the shared resources 733, a failover or writer re-assignment can be implemented rapidly between the virtual machines 713, 715. The file system writer OSFS also periodically persists the transaction log 735 into the object storage 705 as transaction log 737. The writer OSFS can persist the transaction log 735 with various back up techniques (e.g., snapshot, checkpoints, etc.). The persisted transaction log 737 may lag behind the transaction log 735. However, the persisted transaction log 737 can still be used for failover or writer re-assignment to an OSFS instance on a different server device than server device 701. In addition, the transaction log 735 could be stored in a non-volatile storage that is shared/accessible to all server devices of a cluster.

The object storage 705 is depicted with namespace objects 747 and inode objects 749. Each file system entity presented to the client devices 751, 753, 755 is backed by a namespace object and inode object pair. Although the client devices 751, 753, 755 should have a consistent view of the file system backed by the namespace objects 747 and the inode objects 749, the object storage 705 is likely designed to favor availability over consistency. So, the object storage 705 likely offers eventual consistency as data is replicated across storage devices across different data centers. This allows for the possibility of inconsistent views of the file system across the client devices 751, 753, 755. For instance, the client 755 may have a view of the file system based on inode objects 749A and namespace objects 747A, which are have not yet been synchronized with the namespace objects 747 and the inode objects 749. Although it can be acceptable for a client to have a lagging view of the file system in order to satisfy performance objectives for file system commands (e.g., time to return a file system command response), the file system writer relies on a current view of the file system. The OSFS instance designated as the file system writer can specify a consistency strength level in object storage requests and rely on the specified consistency strength level in guiding its corresponding cache for a consistent view of the objects that back the file system. For instance, the writer OSFS instance can specify a consistency strength level of n replication nodes. When specified data has replicated across at least n nodes in the data centers or cluster that supports the object storage, then the object storage service communicates the satisfaction of the specified consistency strength level. The OSFS can direct the OSFS cache to maintain data corresponding to the requested consistency strength level until the object storage service indicates that the specified consistency strength level has been satisfied. The OSFS could also be configured to allow the OSFS cache to evict some data of a transaction that has not reached the requested consistency strength level. For instance, the OSFS may specify a consistency strength level of 4 nodes. The OSFS can direct the OSFS cache to preserve all file system data of the transaction in cache until at least a 2 node level has been reached. When this intermediate level has been reached, the OSFS allows the OSFS cache to evict some of that data while also maintaining data to indicate which objects have been evicted. If a read request is received prior to the object storage indicating that the 4 node level has been satisfied, then the outcome depends on the read request and the data that was preserved. If the read request can be fulfilled with the data that was preserved in the OSFS cache, then the read request is fulfilled. Otherwise, the OSFS cache has maintained sufficient information to determine that the read request may be given a stale view of the file system. The OSFS implementation may return an error/failure unless a stale view is acceptable.

While the objects backing the OSFS can be accessed with an OSFS stack, the structure and content of the backing objects also facilitate access of the objects without the OSFS stack while preserving namespace hierarchy. The structure and content ("schema") of the backing objects can be communicated to a client device with an extensible markup language file, for example. With the schema and an object storage interface, the client can construct the namespace hierarchy of a file system.

Figure 8:
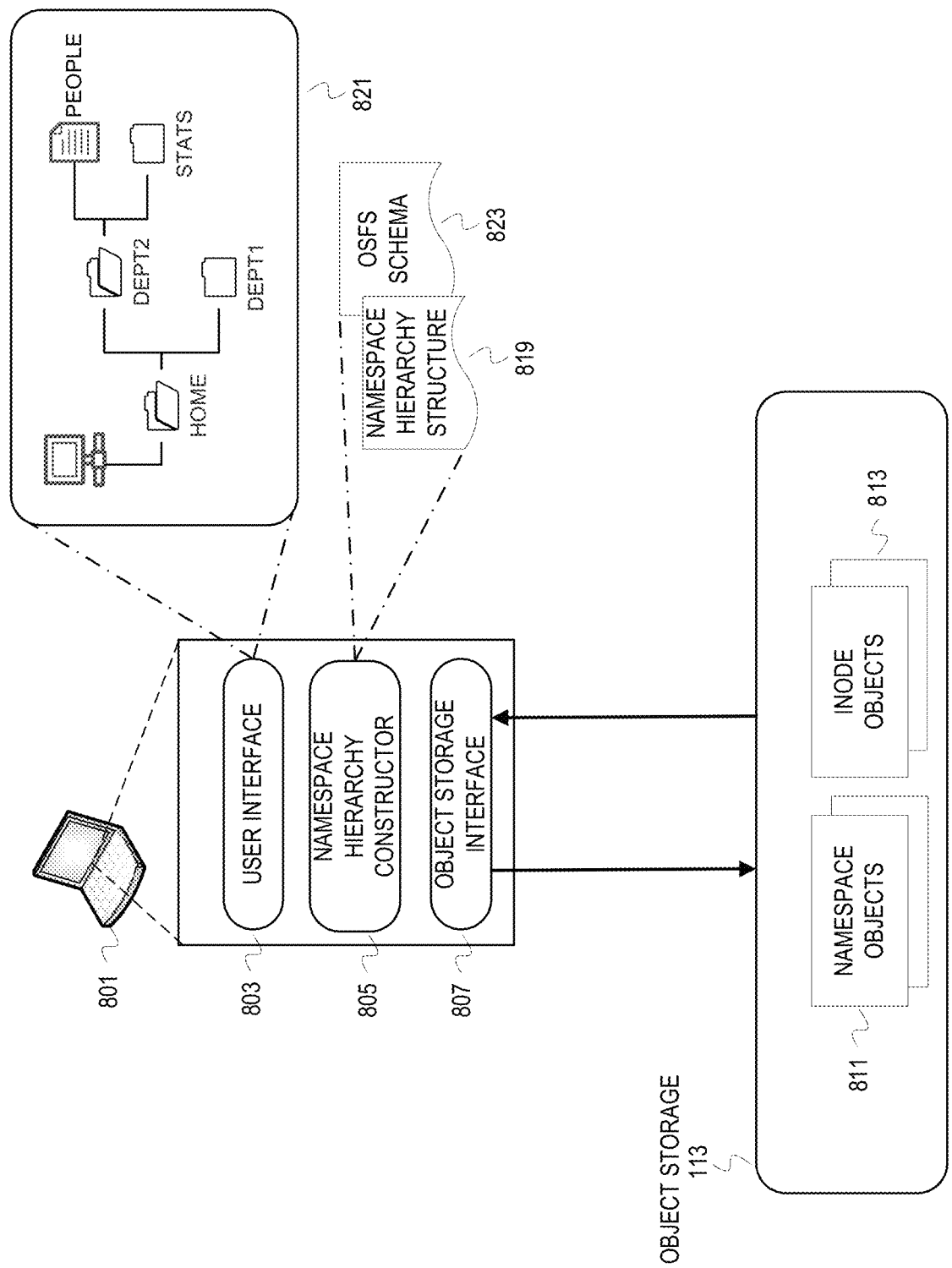
FIG. 8 depicts an example conceptual diagram of a client constructing a file system namespace hierarchy with namespace objects and inode objects.

FIG. 8 depicts an example conceptual diagram of a client constructing a file system namespace hierarchy with namespace objects and inode objects. A client 801 hosts a user interface 803, (e.g., a web browser based user interface), a namespace hierarchy constructor 805, and an object storage interface 807 (e.g. an OpenStack object storage interface) that defines/presents commands or requests to access the object storage 113 from FIG. 1. The client 801 requests objects and/or information from the object storage 113 based on an OSFS schema 823 incorporated into the namespace hierarchy constructor 805. The client 801 can have previously retrieved or received the OSFS schema 823.

With the OSFS schema 823, the namespace hierarchy constructor 805 creates a namespace hierarchy structure 819. The namespace hierarchy constructor 805 determines with the OSFS schema 823 how namespace hierarchy is preserved in namespace objects 811 without a need to access the inode objects 813. The namespace hierarchy constructor 805 creates the namespace hierarchy structure 819 for consumption by the user interface 803. In other words, the namespace hierarchy constructor 805 creates the namespace hierarchy structure 819 in a format and structure that can be read/parsed by the user interface 803 to present the graphical depiction 821. For instance, the namespace hierarchy structure 819 may be a tree type of structure that can be traversed by the user interface 803.

The graphical depiction 821 of the namespace hierarchy constructed from the namespace objects 811 only presents a partial view of the file system. This partial view results from navigation to the directory DEPT2. The namespace hierarchy constructor 805 may create the namespace hierarchy structure 819 on-demand or in entirety. For on-demand, the namespace hierarchy constructor 805 can request namespace objects dependent upon user selections after retrieving namespace object keys up to a default depth (e.g., the root plus one level). The namespace hierarchy constructor 805 can discover the entire namespace hierarchy from the namespace objects 811 and allow the user interface 803 to control presentation of the information. While the graphical depiction 821 distinguishes between file containers (i.e., directories or folders) and files, this distinction may rely on information from the inode objects (i.e., object type defined in the inode objects). However, namespace object keys can encode extension information that allows for distinction between files and file containers.

Figure 9:
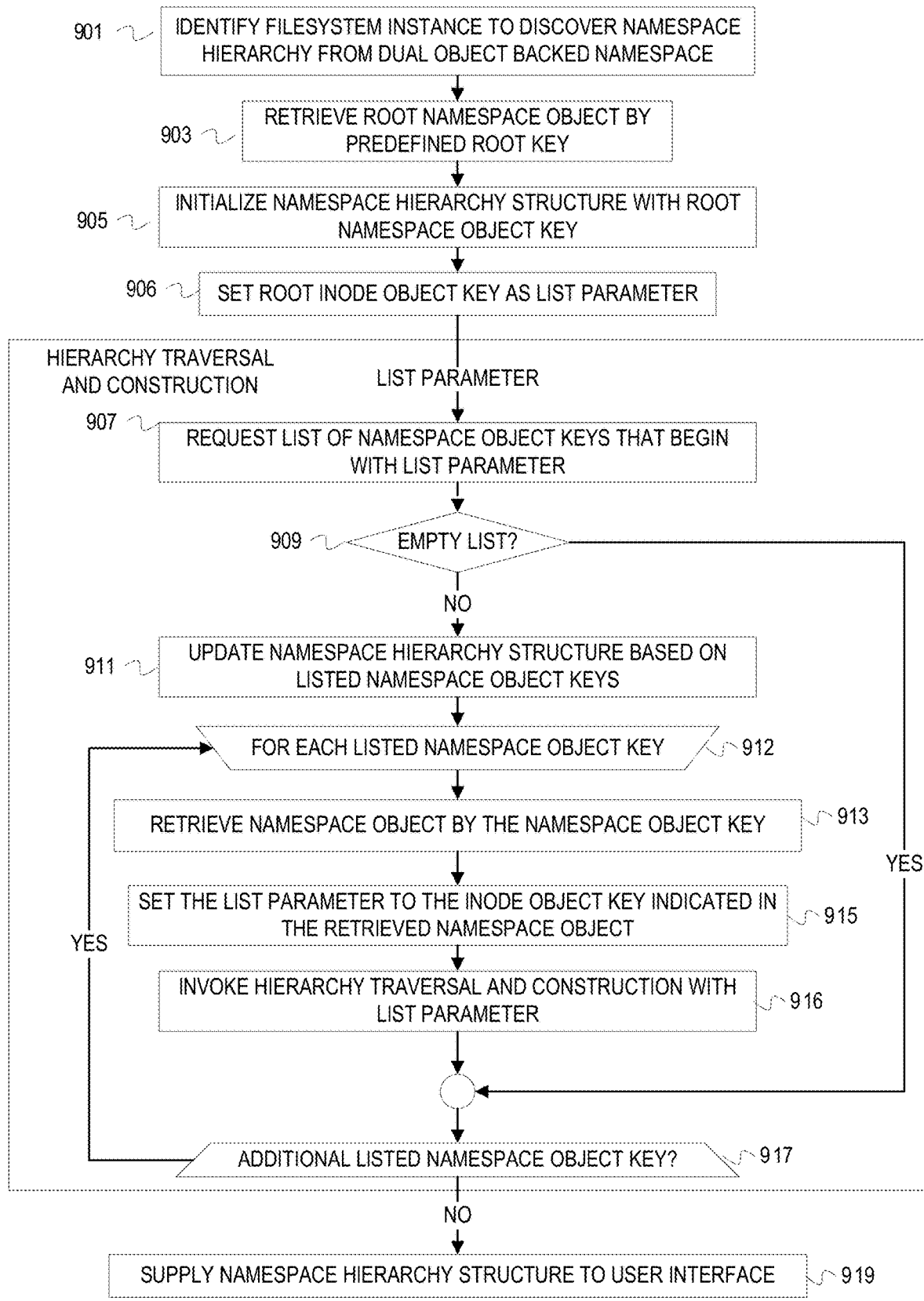
FIG. 9 is a flowchart of example operations for constructing a namespace hierarchy structure from namespace objects.

FIG. 9 is a flowchart of example operations for constructing a namespace hierarchy structure from namespace objects. FIG. 9 refers to a client as performing the example operations.

At block 901, the client identifies a file system instance to discover namespace hierarchy from the dual object backed namespace. A file can identify one or more available file system instances by corresponding cloud storage container/ account. A user interface may read the file to present the options in a graphical user interface for selection. A user interface can also be configured to select an account specified by default. The client establishes a session or connection with the account.

At block 903, the client retrieves a root namespace object by a predefined root key. A root key may have a reserved key value. Or a root key may be predefined as "/" or "C://" for a particular file system instance, for example. This can be defined in a configuration file or communicated in a web based message, such as an HTTP message. The cloud storage container will have a single object with the root object key.

At block 905, the client initializes a namespace hierarchy structure with the root namespace object key. Since the root namespace object key may be a predefined value by file system type, the client can initialize the namespace hierarchy structure prior to interacting with cloud storage.

At block 906, the client sets a list parameter as the root inode object key. As previously explained, the namespace objects include metadata that indicates the key of the corresponding inode object. As also previously explained, a namespace object key includes the inode object key of a containing parent inode object. Thus, an inode object key can be used as a parameter to get a list of all objects that begin with the inode object key. Assuming the inode object backs a file container, this effectively returns a list of the contents of the file container in the file system.

At block 907, the client requests a list of objects that begin with the list parameter. For example, the client can send an OpenStack object storage defined list command with the list parameter as a prefix argument or a Get Bucket request with the list parameter as a prefix argument. Based on the OSFS schema, the response will include a list of namespace objects that begin with the inode object key, since an inode object key is used as the list parameter.

At block 909, the client determines whether the returned list is empty. The client can parse the object storage response for a particular code, flag, or lack of content to determine that the list is empty (i.e., no namespace objects begin with the specified prefix). If there is no namespace object that begins with the specified inode object key, then control flows to block 917. If the inode object key corresponds to a file container, then the file container is empty. If the specified inode object key corresponds to a file instead of a file container, then no namespace object key will begin with the inode object key. If an object begins with the specified inode object key, then control flows to block 911.

At block 911, the client updates the namespace hierarchy structure based on the listed namespace object keys. Since the namespace object keys comprise the parent inode object key and the file system entity name, the client can update the namespace hierarchy structure to indicate the file system entity names and hierarchical relationships. The client will have previously obtained the namespace object keys corresponding to the inode object keys, and will therefore have the file system entity names of the parent objects. The client can update the namespace hierarchy structure by inserting an entry or node into the structure for each listed namespace object key.

At block 912, the client begins to traverse the list and perform operations for each listed namespace object key. This can be considered a depth first type of traversal. Embodiments can construct the namespace hierarchy structure according to different techniques, for example adding each level instead of depth first.

At block 913, the client retrieves the namespace object by the namespace object key. For example, the client communicates a GET request with the namespace object key to the object storage.

At block 915, the client sets the list parameter to the inode object key indicated in the retrieved namespace object. The client reads the retrieved namespace object to determine the corresponding inode object key. With the inode object key, the client can recursively invoke the hierarchy traversal and construction method/function, which encompasses the example operations represented by blocks 907, 909, 911, 912, 913, 915, 916, and 917.

At block 917, the client determines whether there is an additional listed namespace object key. If there is an additional listed namespace object key, then control returns to block 912. Otherwise, control continues to block 919, unless the recursive stack still contains recursive calls to the hierarchy traversal and construction method/function.

At block 919, the client supplies the namespace hierarchy structure to a user interface. The client provides the structures for the user interface to present the file system to a user. Embodiments do not necessarily wait until completion of the structure to provide a user interface access to the namespace hierarchy structure.

The example illustrated with FIG. 9 begins the hierarchy discovery from a root. Embodiments, however, are not so limited. Program code can specify a sub-directory or allow specification of a sub-directory at which to begin the discovery. For example, a namespace hierarchy may include a path "/company/engineering." Instead of beginning the discovery from the root, the discovery can begin from the "engineering" directory. The discovery program code would retrieve the namespace object that includes "engineering" in its object storage key. With the namespace object, the discovery program code can determine the object storage key for the inode object that represents the directory "engineering." The discovery program code can then begin requesting listings of object keys that begin with the inode object key for "engineering."

Variations

The examples discuss transaction dependencies. Embodiments can design file system handlers to form transactions with fewer dependencies or no dependencies. In the case of no explicit dependencies, a file system command handler can maintain state information that corresponds to completion of transactions spawned for a file system command. In addition, a file system command handler can determine dependencies at different granularities. Referring to a my command that renames a file system entity, a my handler can create a validation transaction and a dependent transaction formed from the object instances that create a new namespace object and delete the old namespace object instead of a create transaction and a delete transaction. If the object storage request generated from the create new namespace object operation instance fails, then the OSFS cache will return the failure without proceeding to the object storage request to delete the old namespace object.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. With respect to FIG. 4, block 313 may not be performed in an embodiment that does not explicitly track or determine dependences among transactions of a file system command. In addition, the submission of independent transactions as represented by block 311 may not be performed until the root transaction is submitted. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 10:
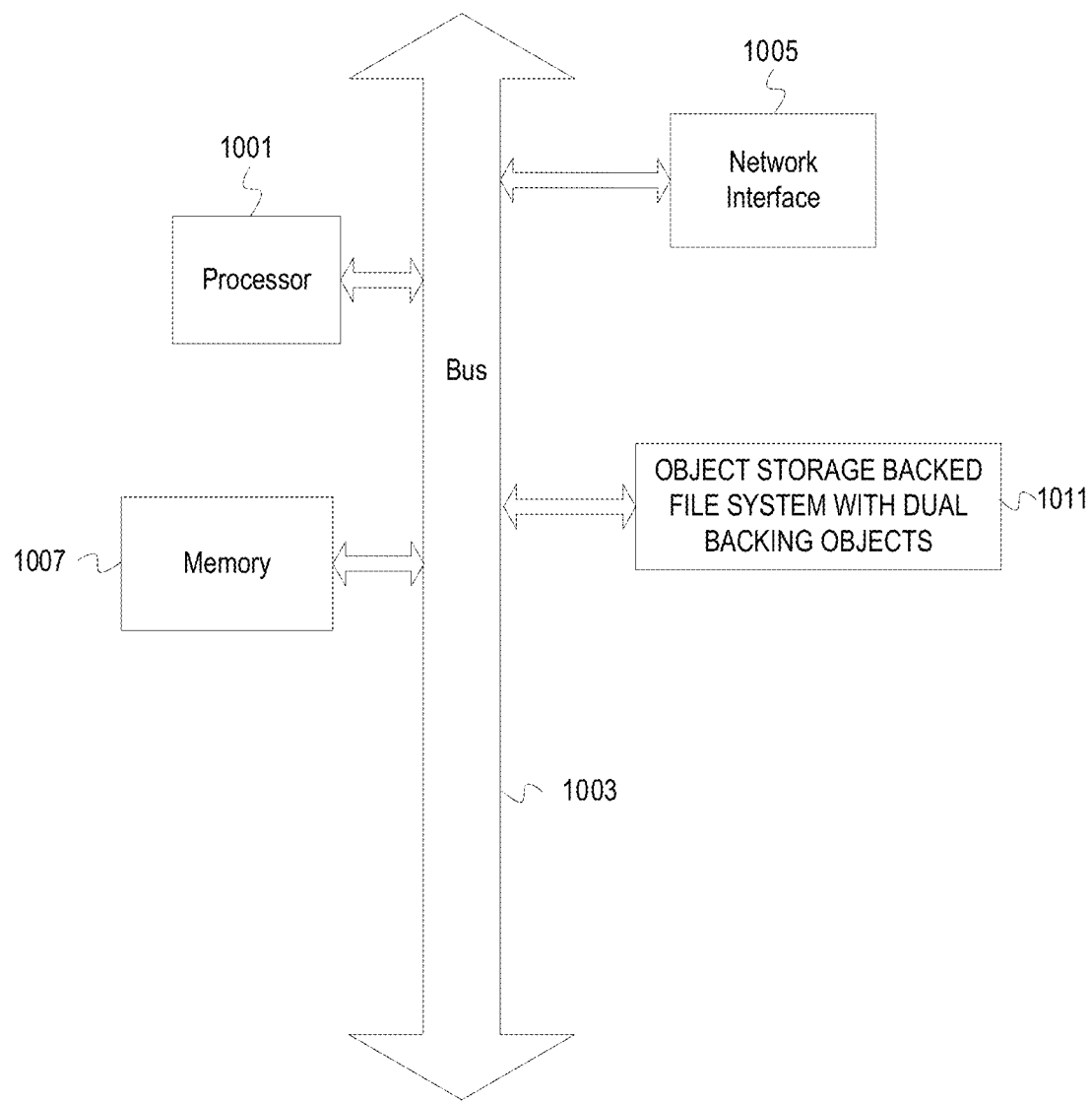
FIG. 10 depicts an example computer system with an object storage backed file system with dual backing objects.

FIG. 10 depicts an example computer system with an object storage backed file system with dual backing objects. The computer system includes a processor 1001 (possibly including multiple processors, multiple cores, multiple nodes, and/or implementing multi-threading, etc.). The computer system includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1003 (e.g., PCI, ISA, PCI-Express, HyperTransport® bus, InfiniBand® bus, NuBus, etc.) and a network interface 1005 (e.g., a Fiber Channel interface, an Ethernet interface, an internet small computer system interface, SONET interface, wireless interface, etc.). The system also includes an OSFS 1011. The OSFS 1011 creates and maintains at least a pair of objects that back each file system entity presented by the OSFS 1011. The dual backing objects include a namespace object and an inode object. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 8 (e.g., video cards, audio cards, additional network interfaces, peripheral devices, etc.). The processor 1001 and the network interface 1005 are coupled to the bus 803. Although illustrated as being coupled to the bus 1003, the memory 1007 may be coupled to the processor 1001.

While the aspects of the disclosure are described with reference to various implementations and exploitations, it will be understood that these aspects are illustrative and that the scope of the claims is not limited to them. For instance, many of the example illustrations use an inode number to derive a key for an inode object. That is not necessary. An OSFS can be designed that uses an identifier that uniquely identifies a file system entity (e.g., directory or file) other than a directory name or file name. Another example of such an identifier that can be used as an object key for what is referred to herein as an inode object is a unique universal identifier (uuid). In general, techniques for an object storage backed file system that efficiently manipulates namespace as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
requesting, from an object storage that stores objects that back a file system, a first listing of namespace object keys each of which begins with a first object key by setting a list parameter as a root inode object key, wherein the object storage stores inode metadata of the file system as inode objects and hierarchical namespace encoding of the file system as namespace objects according to a flat namespace;
updating a structure based, at least in part, on the namespace object keys in the first listing, wherein the structure indicates a namespace hierarchy for the file system;
for each of the namespace object keys in the first listing,
retrieving from the object storage a namespace object identified by the first object key;
determining a second object key from the namespace object identified by the first object key;
setting the list parameter to the second object key; and
traversing the namespace hierarchy, including requesting from the object storage a second listing of namespace object keys, wherein each namespace object key in the second listing begins with the second object key;
constructing the namespace hierarchy, including updating the structure based, at least in part, on the namespace object keys in the second listing; and
supplying the structure for presentation of the namespace hierarchy.

2. The method of claim 1,
wherein each of the namespace objects in the first listing of namespace object keys comprise a self-identifying object key and an object key that identifies a corresponding second object.

3. The method of claim 1, wherein the first listing of namespace object keys and the second listing of namespace object keys are listings of different subsets of objects.

4. The method of claim 1, wherein each of the namespace object keys identified by the first listing of namespace object keys comprises a name of a file or file container represented by a first namespace object and an object key of a second namespace object that represents a parent file container of the file or file container represented by the first namespace object.

5. The method of claim 1, wherein each of the namespace objects identified by the first listing of namespace object keys corresponds to an inode object that comprises an inode number of a file or file container represented by the inode object.

6. The method of claim 1, wherein each of the namespace objects identified by the first listing of namespace object keys and a corresponding inode object represent a file or file container of the file system.

7. The method of claim 1, wherein each of the namespace objects identified by the first listing of namespace object keys has a corresponding inode object comprising a self-identifying key and at least an indication of a file or file container.

8. The method of claim 1, wherein the second object key is determined from the namespace object identified by the first object key through a mapping of an inode number of a file system entity to a parent inode and entity name.

9. One or more non-transitory machine-readable media having program code for an object storage backed file system, the program code comprising instructions to:
request, from an object storage that stores objects that back a file system, a first listing of namespace object keys that each begins with a first object key by setting a list parameter as a root inode object key, wherein the object storage stores inode metadata of the file system as inode objects and hierarchical namespace encoding of the file system as namespace objects according to a flat namespace;
update a structure based, at least in part, on the namespace object keys in the first listing, wherein the structure indicates a namespace hierarchy for the file system;
for each of the namespace object keys in the first listing,
retrieve from the object storage a namespace object identified by the first object key;
determine a second object key from the namespace object identified by the first object key;
set the list parameter to the second object key; and
traverse the namespace hierarchy, including requesting from the object storage a second listing of namespace object keys that each begins with the second object key;
construct the namespace hierarchy, including updating the structure based, at least in part, on the namespace object keys in the second listing; and
supply the structure for presentation of the namespace hierarchy.

10. The non-transitory machine-readable media of claim 9,
wherein each of the namespace objects in the first listing of namespace object keys comprise a self-identifying object key and an object key that identifies a corresponding second object.

11. The non-transitory machine-readable media of claim 9, wherein the first listing of namespace object keys and the second listing of namespace object keys are listings of different subsets of objects.

12. The non-transitory machine-readable media of claim 9, wherein each of the namespace object keys identified by the first listing of namespace object keys comprises a name of a file or file container represented by a first namespace object and an object key of a second namespace object that represents a parent file container of the file or file container represented by the first namespace object.

13. The non-transitory machine-readable media of claim 9, wherein each of the namespace objects identified by the first listing of namespace object keys corresponds to an inode object that comprises an inode number of a file or file container represented by the inode object.

14. The non-transitory machine-readable media of claim 9, wherein each of the namespace objects identified by the first listing of namespace object keys and a corresponding inode object represent a file or file container of the file system.

15. The non-transitory machine-readable media of claim 9, wherein each of the namespace objects identified by the first listing of namespace object keys has a corresponding inode object comprising a self-identifying key and at least an indication of a file or file container.

16. An apparatus comprising:
   a processor;
   a network interface; and
   a machine-readable medium comprising program code executable by the processor to cause the apparatus to,
   request, via the network interface from an object storage that stores objects that back a file system, a first listing of namespace object keys that each begins with a first object key by setting a list parameter as a root inode object key, wherein the object storage stores inode metadata of the file system as inode objects and hierarchical namespace encoding of the file system as namespace objects according to a flat namespace;
   update a structure based, at least in part, on the namespace object keys in the first listing, wherein the structure indicates a namespace hierarchy for the file system;
   for each of the namespace object keys in the first listing,
      retrieve from the object storage a namespace object identified by the first object key;
      determine a second object key from the namespace object identified by the first object key;
      set the list parameter to the second object key; and
      traverse the namespace hierarchy, including requesting from the object storage a second listing of namespace object keys that each begins with the second object key;
   construct the namespace hierarchy, including updating the structure based, at least in part, on the namespace object keys in the second listing; and
   supply the structure for presentation of the namespace hierarchy.

17. The apparatus of claim 16, wherein each of the namespace objects in the first listing of namespace object keys comprise a self-identifying object key and an object key that identifies a corresponding second object.

18. The apparatus of claim 16, wherein the first listing of namespace object keys and the second listing of namespace object keys are listings of different subsets of objects.

19. The apparatus of claim 16, wherein each of the namespace object keys identified by the first listing of namespace object keys comprises a name of a file or file container represented by a first namespace object and an object key of a second namespace object that represents a parent file container of the file or file container represented by the first namespace object.

20. The apparatus of claim 16, wherein each of the namespace objects identified by the first listing of namespace object keys corresponds to an inode object that comprises an inode number of a file or file container represented by the inode object.

* * * * *